(12) United States Patent
Hirose

(10) Patent No.: US 7,742,695 B2
(45) Date of Patent: Jun. 22, 2010

(54) CAMERA SYSTEM AND LENS APPARATUS

(75) Inventor: Minoru Hirose, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 187 days.

(21) Appl. No.: 11/960,564

(22) Filed: Dec. 19, 2007

(65) Prior Publication Data

US 2008/0187304 A1 Aug. 7, 2008

(30) Foreign Application Priority Data

Feb. 2, 2007 (JP) ............................. 2007-024432

(51) Int. Cl.
G03B 7/10 (2006.01)
H04N 5/238 (2006.01)

(52) U.S. Cl. .................................. 396/260; 348/363

(58) Field of Classification Search ................ 396/257, 396/259, 260; 348/363
See application file for complete search history.

(56) References Cited

U.S. PATENT DOCUMENTS

| | | | |
|---|---|---|---|
| 4,952,859 A * | 8/1990 | Torisawa et al. ............ 318/696 |
| 5,278,605 A * | 1/1994 | Satoh .......................... 396/63 |
| 5,418,588 A * | 5/1995 | Chigira ........................ 396/463 |
| 6,040,677 A * | 3/2000 | Oono et al. ................... 318/696 |
| 6,051,949 A | 4/2000 | Oono et al. | |
| 2003/0231879 A1 | 12/2003 | Kohno | |
| 2006/0279641 A1* | 12/2006 | Takahashi et al. ......... 348/226.1 |

FOREIGN PATENT DOCUMENTS

| JP | 11-064921 A | 3/1999 |
|---|---|---|
| JP | 2002-156681 A | 5/2002 |
| JP | 2003-337277 A | 11/2003 |

* cited by examiner

*Primary Examiner*—W. B. Perkey
*Assistant Examiner*—Noam Reisner
(74) *Attorney, Agent, or Firm*—Canon U.S.A., Inc. I.P. Division

(57) ABSTRACT

A camera system for driving a diaphragm by a stepping motor including first and second coils and capable of 2-phase driving, includes a display unit configured to display an image signal, a live view control unit configured to display image signals sequentially read from an image sensor in the display unit, and a control unit configured to set only one of the first and second coils to be in an energized state when the live view control unit displays the image signals in the display unit.

5 Claims, 10 Drawing Sheets

FIG.7

| PHASE OF STEPPING MOTOR | IN OPTICAL FINDER MODE | IN LIVE VIEW DISPLAY MODE |
|---|---|---|
| 0 | 1-PHASE EXCITATION DRIVING | 1-PHASE EXCITATION DRIVING |
| 1/8 | 2-PHASE EXCITATION DRIVING | NOT USED |
| 2/8 | 1-PHASE EXCITATION DRIVING | 1-PHASE EXCITATION DRIVING |
| 3/8 | 2-PHASE EXCITATION DRIVING | NOT USED |
| 4/8 | 1-PHASE EXCITATION DRIVING | 1-PHASE EXCITATION DRIVING |
| 5/8 | 2-PHASE EXCITATION DRIVING | NOT USED |
| 6/8 | 1-PHASE EXCITATION DRIVING | 1-PHASE EXCITATION DRIVING |
| 7/8 | 2-PHASE EXCITATION DRIVING | NOT USED |

FIG.9
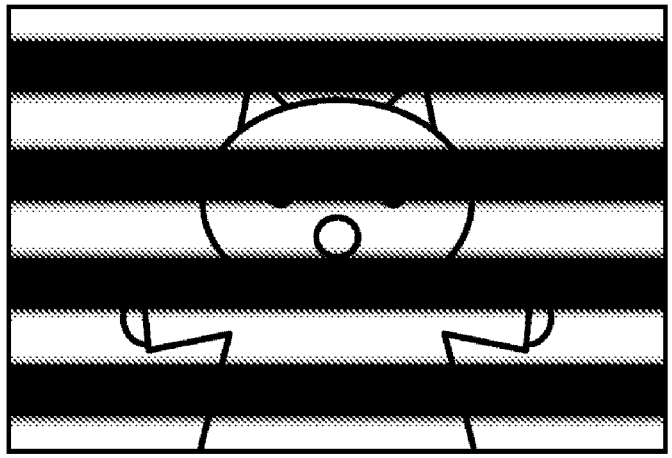
A
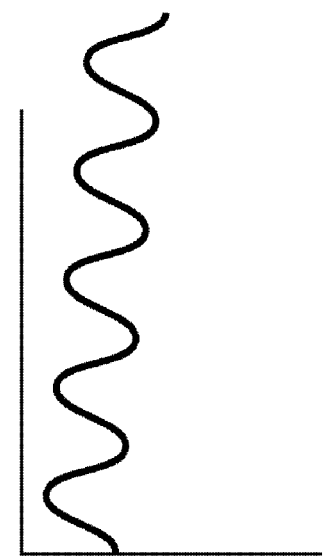
HORIZONTAL
PROJECTION Ah
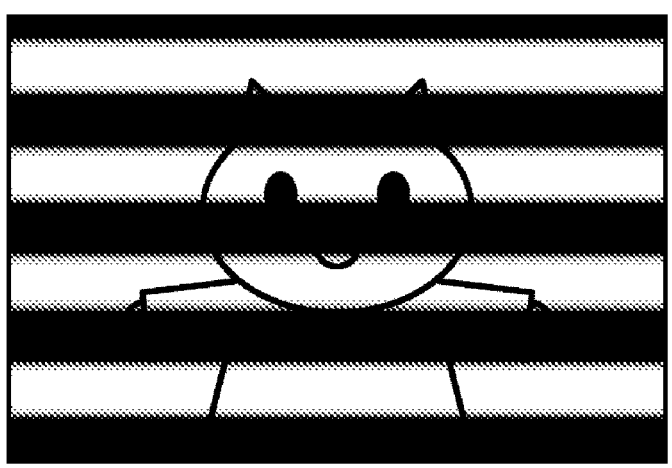
B
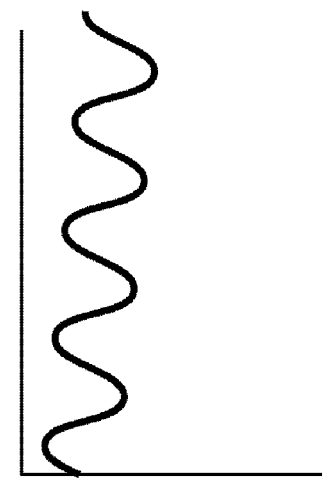

FIG.10
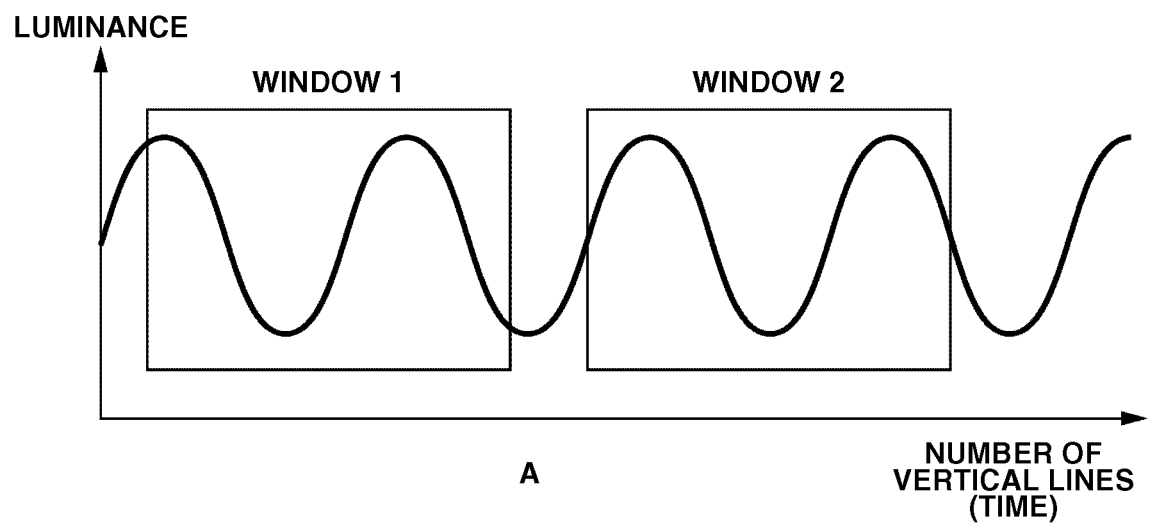
A
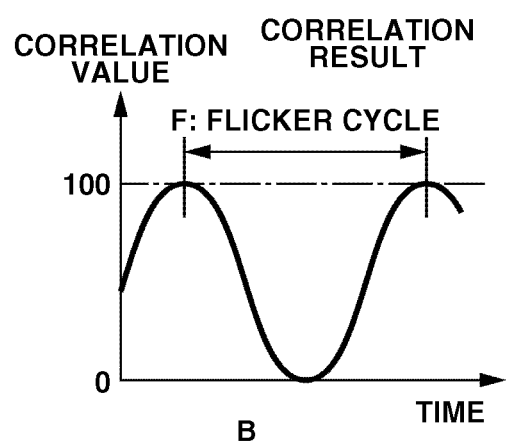
B

CAMERA SYSTEM AND LENS APPARATUS

BACKGROUND OF THE INVENTION

1. Field of the Invention

The present invention relates to power saving measures in diaphragm driving control of a camera system and a lens apparatus.

2. Description of the Related Art

The presently used digital single lens reflex camera includes a live view function (moving image checking function) which enables a user to check captured images by sequentially displaying image signals read from an image sensor on a display unit such as a liquid crystal display (LCD) mounted on the back of the camera.

In addition, an exposure value during shooting of a still image is determined by metering light of the captured scenes. Further, an exposure value of an image displayed as a live view image on the display unit such as an LCD is controlled by an automatic exposure control function.

Generally, during a live view function operation, a number of diaphragm driving times is reduced as much as possible to prevent a deterioration in focus detection accuracy and to secure quietness, and a diaphragm is controlled with full aperture priority.

However, when shooting a scene in a high luminance state, live view needs to be displayed by maintaining an aperture in a reduced state. That is, the image sensor has to be used as both an imaging sensor and a light metering sensor to realize the live view function in the digital single lens reflex camera. In other words, since the image sensor having a restricted dynamic range is used as the light metering sensor, the aperture needs to be reduced in order to prevent saturation.

Further, when a still image is captured with a camera system which includes no live view function, an aperture needs to be reduced in order to detect a flicker phenomenon occurring due to an illuminance change of a captured scene. In this case, in a diaphragm driving device which drives a diaphragm by a stepping motor, power consumption is increased since a current has to be continuously applied to maintain the aperture reduced state.

Unless the current is continuously applied, the reduced state of the aperture cannot be maintained, which causes a change in an aperture reducing position. In other words, an aperture becomes different from a set aperture, which causes an error in a light metering value and accuracy of exposure control is reduced.

This phenomenon is not only applied to the digital single lens reflex camera equipped with the live view function. Also in a camera system equipped with a diaphragm control device which drives a diaphragm by a stepping motor, the above described phenomenon occurs if the camera is configured to enter a power cut-off state after a diaphragm button is pressed to reduce an aperture.

Japanese Patent Application Laid-Open No. 2002-156681 discusses a camera system which drives the diaphragm by the stepping motor. The camera system discussed there opens a diaphragm again to execute light metering anew if a shooting instruction is received while a diaphragm button is pressed, and carries out shooting while the current is being applied.

In the camera system discussed in Japanese Patent Application Laid-Open No. 2002-156681, upon reception of the shooting instruction while the diaphragm button is pressed, exposure control is carried out cutting off the current to avoid power consumption after an aperture is reduced. The diaphragm is opened again when light metering is executed anew. This operation causes a release time lag since the light metering is executed all over again.

Therefore, the above-described problem cannot be solved by the discussed camera system. The same holds true for the camera system equipped with no live view function.

SUMMARY OF THE INVENTION

The present invention is directed to an imaging system for driving a diaphragm by a stepping motor, which can maintain a power saving feature, and perform highly accurate exposure control.

According to an aspect of the present invention, a camera system for driving a diaphragm by a stepping motor including first and second coils and capable of 2-phase driving, includes a display unit configured to display an image signal, a live view control unit configured to display image signals sequentially read from an image sensor in the display unit, and a control unit configured to set only one of the first and second coils to be in an energized state when the live view control unit displays the image signals in the display unit.

According to another aspect of the present invention, a camera system for driving a diaphragm by a stepping motor including first and second coils and capable of 2-phase driving, includes a diaphragm position detection unit configured to detect a diaphragm position, a display unit configured to display an image signal, a live view control unit configured to display image signals sequentially read from an image sensor in the display unit, a control unit configured to energize at least one of the first and second coils to drive the diaphragm when the live view control unit displays the image signals in the display unit, and cut off the energization of the coil after the diaphragm is driven to a first position according to a diaphragm value, and a correction unit configured to correct a light metering value obtained based on a second diaphragm value to be a light metering value obtained based on the first position, when a second position of the diaphragm is detected by the diaphragm detection unit after the energization of the coil is cut off by the control unit, and the first and second positions are different from each other.

According to yet another aspect of the present invention, a lens apparatus includes a diaphragm driving unit configured to drive a diaphragm by a stepping motor including first and second coils, a reception unit configured to receive exposure information transmitted from an image device to the lens apparatus, and a control unit configured to set only one of the first and second coils to be in an energized state based on the exposure information received by the reception unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a table illustrating a control phase of diaphragm driving in each shooting mode.

FIG. 9 is a view illustrating a phase difference with respect to the line flicker stripe between two images.

FIG. 10 (A) is a view illustrating two windows provided in a waveform. FIG. 10 (B) is a view illustrating a waveform of the correlation result.

DETAILED DESCRIPTION OF THE EMBODIMENTS

Various exemplary embodiments, features, and aspects of the invention will be described in detail below with reference to the drawings.

First Exemplary Embodiment

Figure 1:
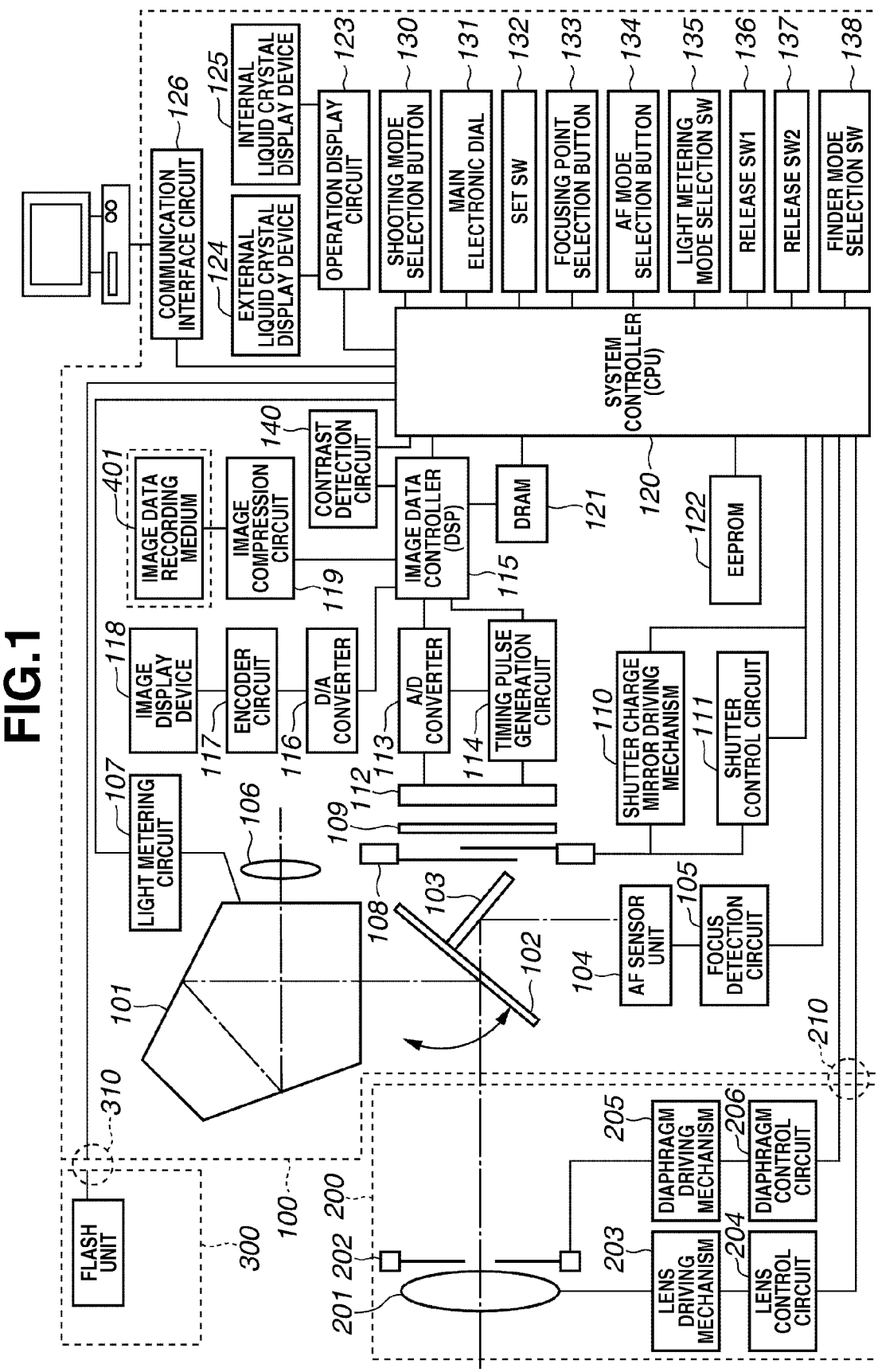
FIG. 1 is a block diagram illustrating a configuration of an imaging apparatus according to a first exemplary embodiment of the present invention.

FIG. 1 is a block diagram illustrating an electrical configuration incorporated in a single lens reflex type digital camera system according to a first exemplary embodiment of the present invention.

The camera system of the exemplary embodiment includes a camera body 100, a lens unit 200 detachably attached by a mount mechanism (not illustrated), and a first electrical contact point group 210 disposed in the mount unit (not illustrated). In the exemplary embodiment, only one photographic lens 201 is illustrated for convenience. As well known, however, the camera system includes a plurality of lenses in reality. The camera system also includes a diaphragm 202 which has a light amount adjust mechanism.

The first electrical contact point group 210 transfers a control signal, a state signal, and a data signal between the camera body 100 and the lens unit 200. Further, the first electrical contact point group 210 includes a function of supplying currents of various voltages, and a function of transmitting a signal to a system controller 120 upon connection with the lens unit 200.

Thus, communication is carried out between the camera body 100 and the lens unit 200 to enable driving of the photographic lens 201 and the diaphragm 202 in the lens unit 200.

The system controller 120 includes a central processing unit (CPU) for controlling the camera body 100. The system controller 120 also functions as a correction unit. The first electrical contact point group 210 can be configured to transmit not only electrical communication but also optical communication or voice communication. The first electrical contact point group 210 and the system controller 120 constitute a lens detection unit.

A shooting beam of light from a subject (not illustrated) is guided through the photographic lens 201 and the diaphragm 202 to a quick return mirror 102 that can be driven in an arrow direction (illustrated). A center of the quick return mirror 102 is a half mirror through which a part of light beam passes when the quick return mirror 102 is lowered. The passed light beam is reflected downward at a submirror 103 mounted on the quick return mirror 102.

An AF sensor unit 104 operating in a well-known phase difference detection method includes a field lens, a reflection mirror, a secondary image forming lens, a stop, and a line sensor constituted of a plurality of CCDs which are arranged near an image forming plane (not illustrated).

Based on a control signal from the system controller 120, a focus detection circuit 105 controls the AF sensor unit 104 to detect a focus by the phase difference detection method. The focus detection unit includes the AF sensor unit 104 and the focus detection circuit 105.

A pentaprism 101 reverses a subject image formed on a focusing screen (not illustrated) left, right, up and down to convert the image into an erect image. An eyepiece lens 106 guides the light beam (finder image) emitted from the pentaprism 101 to eyes of a photographer (not illustrated). The shooting light beam reflected on the quick return mirror 102 reaches the eyes of the photographer through the pentaprism 101 and the eyepiece 106.

An image sensor 112, for example, a charge coupled device (CCD) sensor or a complementally metal oxide semiconductor (CMOS) sensor, has a photoelectric conversion function. A focal plane shutter 108 includes leading and trailing shutter blades, and controls transmission/blocking of the light beam from the photographic lens 201. The leading and trailing shutter blades of the focal plane shutter 108 are driven by a driving source including a spring. The spring has to be charged to resume an operation after shutter traveling.

A filter 109 has a function of guiding only a visible ray to the image sensor 112 while cutting off an infrared ray, as well as a function as an optical low-pass filter. When the quick return mirror 102 is raised, the light beam from the photographic lens 201 reaches the image sensor 112 through the focal plane shutter 108 and the filter 109. When the quick return mirror 102 is raised, the submirror 103 is folded.

A lens driving mechanism 203 moves the photographic lens 201 in an optical axis direction to focus the camera. A lens control circuit 204 controls the lens driving mechanism 203. A diaphragm driving mechanism 205 drives the diaphragm 202. A diaphragm control circuit 206 controls the diaphragm driving mechanism. The lens control circuit 204 and the diaphragm control circuit 206 are connected to the system controller 120.

A shutter charge mirror driving mechanism 110 controls up-and-down driving of the quick return mirror 102 and charging of the focal plane shutter 108. A shutter control circuit 111 controls traveling of the leading and trailing shutter blades of the focal plane shutter 108. A light metering circuit 107 is an automatic exposure device connected to a light metering sensor (not illustrated) arranged near the eyepiece lens 106. An EEPROM 122 is a storage unit for storing a parameter necessary for controlling the camera body 100, camera ID information for enabling individual identification of the camera body 100, AF correction data adjusted by a reference lens, or an automatic exposure correction value.

The shutter charge mirror driving mechanism 110, the shutter control circuit 111, the light metering circuit 107, and the EEPROM 122 are connected to the system controller 120. The light metering sensor (not illustrated) connected to the light metering circuit 107 measures luminance of a subject. Its output is supplied through the light metering circuit 107 to the system controller 120.

A lens control circuit 204 includes a lens storage device for storing information unique to a lens, such as a focal length, a full aperture value, or lens ID allocated to each lens, and information received from the system controller 120.

The system controller 120 controls the lens driving mechanism 203 to form a subject image on the image sensor 112. The system controller 120 also controls the diaphragm driving mechanism 205 for driving the diaphragm 202 based on a set Av value, and outputs a control signal to the shutter control circuit 111 based on a set Tv value.

An image data controller (hereinafter, referred to as digital signal processor (DSP)) 115 performs control of the image sensor 112, and correction or processing of image data input from the image sensor 112 based on commands from the system controller 120.

The correction or the processing of the image data includes white balance processing. The white balance processing is a function of correcting a largest luminance part of a shot image to a predetermined color (white color). The white balance processing can change a correction amount according to a command from the system controller 120.

The system controller 120 and the DSP 115 constitute a light metering unit. The light metering unit divides an image signal into areas by the DSP 115, supplies an integrated value for each Bayer pixel in each area, to the system controller 120, and evaluates an integration signal by causing the system controller 120 to perform light metering.

A timing pulse generation circuit 114 outputs a timing signal necessary for driving the image sensor 112. An analog-to-digital (A/D) converter 113 receives a timing pulse generated by the timing pulse generation circuit 114 together with the image sensor 112, and converts an analog signal corresponding to the subject image output from the image sensor 112, into a digital signal.

A DRAM 121 temporarily stores image data before it is subjected to processing or data conversion into a predetermined format. A digital-to-analog (D/A) converter 116 converts digital data obtained from the DSP 115 into analog data. An image compression circuit 119 compresses or converts the image data stored in the DRAM 121 (e.g., compression by JPEG compression system). The converted image data is stored in a recording medium 401 (i.e., a recording unit) such as a hard disk, a flash memory or a Floppy® disk.

A contrast detection circuit 140 passes the image data corrected by the DSP 115 through a filter of predetermined frequency characteristics based on a command from the system controller 120. Then, the contrast detection circuit 140 evaluates contrast in a predetermined direction of the image signal obtained by executing predetermined gamma processing, and supplies its result to the system controller 120.

The timing pulse generation circuit 114, the A/D converter 113, the D/A converter 121, the image compression circuit 119, and the contrast detection circuit 140 are connected to the DSP 115. The recording medium 401 is connected to the image compression circuit 119. The DSP 115, the image compression circuit 119, and the recording medium 401 constitute a recording unit.

An encoder circuit 117 converts an output of the D/A converter 116 into a video signal (e.g., NTSC signal) necessary for driving an image display device 118. The image display device 118 displays image data captured by the image sensor 112, and it is generally an image display device such as an LCD which includes a color liquid crystal display device.

The image display device 118 is connected to the D/A converter 116 via the encoder circuit 117. The DSP 115 converts the image data of the DRAM 121 into an analog signal by the D/A converter 116 to output the signal to the encoder circuit 117. The D/A converter 116, the image display device 118, and the encoder circuit 117 constitute an image display unit.

The system controller 120 communicates with the lens control circuit 204 to adjust a focal position so that a contrast evaluation value can be higher than a predetermined level. The DSP 115, the contrast detection circuit 140, the system controller 120, the lens control circuit 204, the lens driving mechanism 203, and the photographic lens 201 constitute a second automatic focus detection unit.

An operation display unit 123 displays information about an operation mode or exposure information (shutter time of second or diaphragm value) of the digital camera according to the exemplary embodiment in an external liquid crystal display device 124 or an internal liquid crystal display device 125.

A shooting mode selection button 130 sets a mode to cause the digital camera to execute an operation desired by a user. Also, a main electronic dial 131, and a setting switch (SW) 132 are provided. A focusing point selection button 133 (corresponding to focusing point selection unit) selects a focus detection position to be used from among a plurality of focus detection positions of the AF sensor unit 104. Also, an AF selection button 134, and a light metering mode selection button 135 are provided.

A release switch (SW1) 136 starts a shooting preparation such as light metering or focusing. A release switch (SW2) 137 starts an imaging operation. A finder mode selection switch 138 is also provided. The operation display circuit 123, the shooting mode selection button 130, the main electronic dial 131, the setting SW 132, the focusing point selection button 133, the AF mode selection button 134, and the light metering mode selection button 135 are connected to the system controller 120. The release switch (SW1) 136, the release switch (SW2) 137, and the finder mode selection switch SW1 138 are connected to the system controller 120.

The external and internal liquid crystal display devices 124 and 125 constitute the operation display unit while the external liquid crystal display device 124 corresponds to an external display unit, and the internal liquid crystal display unit 125 corresponds to an internal display unit. The operation display circuit 123 and the system controller 120 constitute a display control unit.

The finder mode selection SW 138 is configured to switch between an optical finder mode and a live view display mode. The optical finder mode enables checking of a light beam passed through the eyepiece lens 106. In the live view display mode, image signals received by the image sensor 112 are sequentially displayed in the image display device 118.

A flash unit 300 is detachably attached to the camera body 100 by the mount mechanism (not illustrated) to emit a flash light. A second electrical contact point group 310 is disposed in the mount unit.

The second electrical contact point group 310 has a function of transferring a control signal, a state signal, or a data signal between the camera body 100 and the flash unit 300, and a function of transmitting a signal to the system controller 120 when the flash unit 300 is connected.

Thus, the camera body 100 communicates with the flash unit 300 to enable controlling of flash light emission. The contact point group 310 can be configured to transmit not only electrical communication but also optical communication or voice communication.

Figure 2:
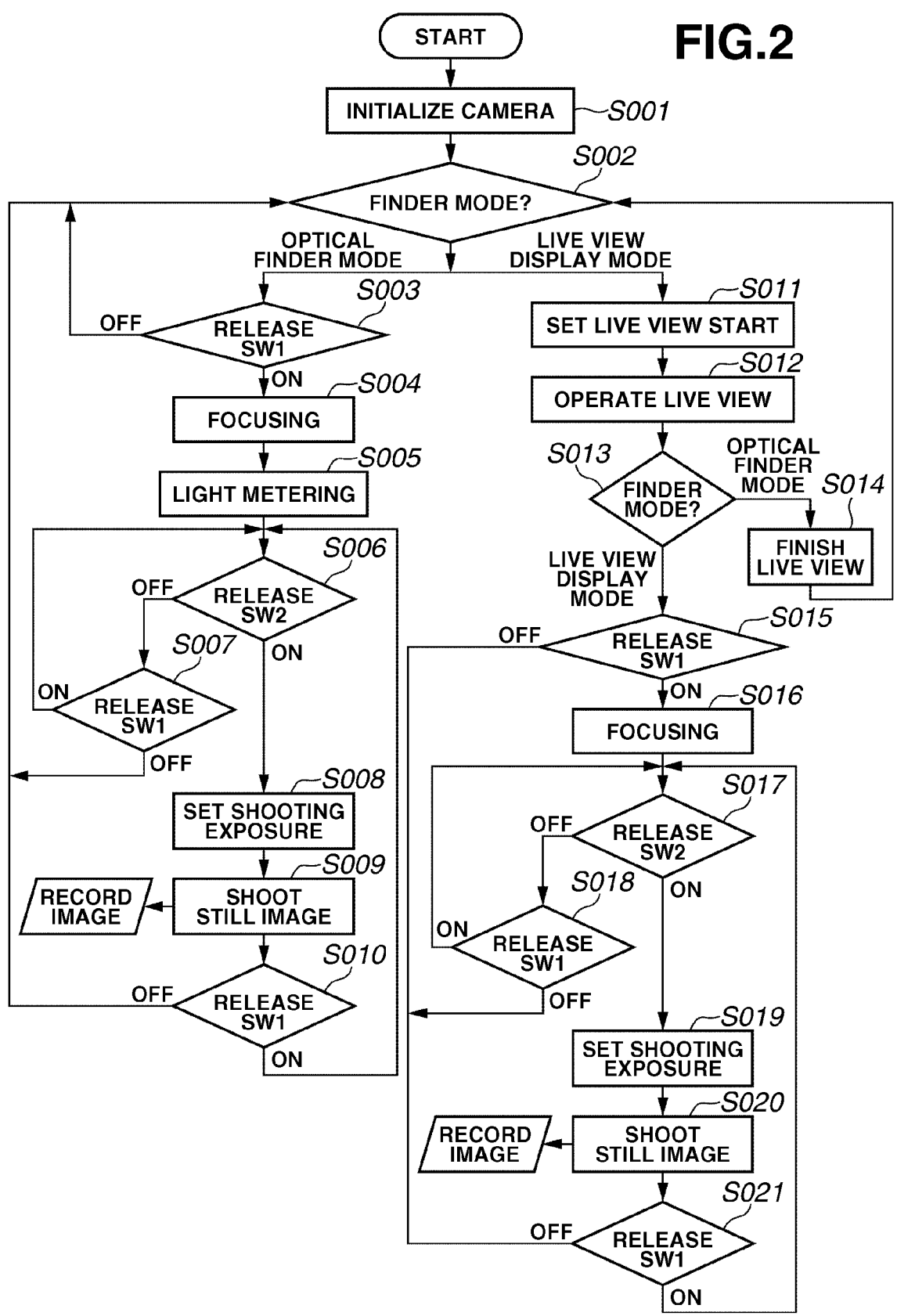
FIG. 2 is a flowchart illustrating an operation flow according to the first exemplary embodiment of the present invention.

The system configured in the above-described manner will be described in detail referring to FIG. 2, which illustrates an operation flow according to the first exemplary embodiment of the present invention.

In step S001, by powering ON when battery is changed, the system controller 120 initializes a flag or a control variable, and records a control parameter or a set value in the EEPROM 122 which is a nonvolatile memory. In step S002, the system controller 120 checks a state of the finder mode selection SW 138.

The process proceeds to step S003 if the optical finder mode is selected, and to step S011 if the live view display mode is selected.

An operation in the optical finder mode will be described referring to steps S003 through S010 in FIG. 2. In step S003, the system controller 120 checks a state of the release switch (SW1) 136, and returns to step S002 if the state is OFF. If the state is ON, the process proceeds to step S004.

In step S004, the system controller 120 communicates with the lens control circuit 204 in response to outputs from the AF sensor unit 104 and the focus detection unit 105, and drives the photographic lens 201 to move to a desired position with the lens driving mechanism 203 in order to adjust a focus state.

In step S005, the system controller 120 carries out light metering calculation to obtain an exposure control value (i.e., Bv value) according to a state of the light metering mode selection SW 135 and an output from the light metering circuit 107, and holds the exposure control value.

The exposure control value (i.e., Bv value) is an index indicating a luminance level, and represented by the following equation:

$$Bv = Tv + Av - Sv$$

Tv: shutter speed (corresponding to storage time)
Av: diaphragm value
Sv: gain level such as ISO sensitivity In step S006, the system controller 120 checks a state of the release switch (SW 2) 137. If a state of the release switch (SW2) 137 is in an OFF state, the process proceeds to step S007. If the release switch (SW2) 137 is in an ON state, the process proceeds to step S008, and the system controller 120 starts a shooting operation.

In step S007, the system controller 120 checks the state of the release switch (SW1)136, and returns to step S006 if the ON state is maintained. If the release switch (SW1) 136 is in an OFF state, the system controller 120 discards the exposure control value it holds and the process returns to step S002.

In step S008, the system controller 120 determines a Tv value, an Av value, and an Sv value for the shooting operation, according to the exposure control value (Bv value) calculated in step S005 and a state of a shooting mode.

The shooting mode is a shooting parameter which can be set by the shooting mode selection button 130. An Av priority mode, a Tv priority mode, an automatic setting mode, and a manual setting mode can be selected. However, the shooting mode is not limited to such modes.

The system controller 120 notifies the determined Av value to the diaphragm control circuit 206. Based on the notified Av value, the diaphragm control circuit 206 sends a pulse corresponding to a diaphragm driving amount to the diaphragm driving mechanism 205 so as to drive a diaphragm to a desired diaphragm position.

The diaphragm driving mechanism 205 operates the stepping motor based on the received pulse signal, reduces the aperture to a desired position, and continues an energized state of a coil to maintain the aperture reduced state.

Figure 3:
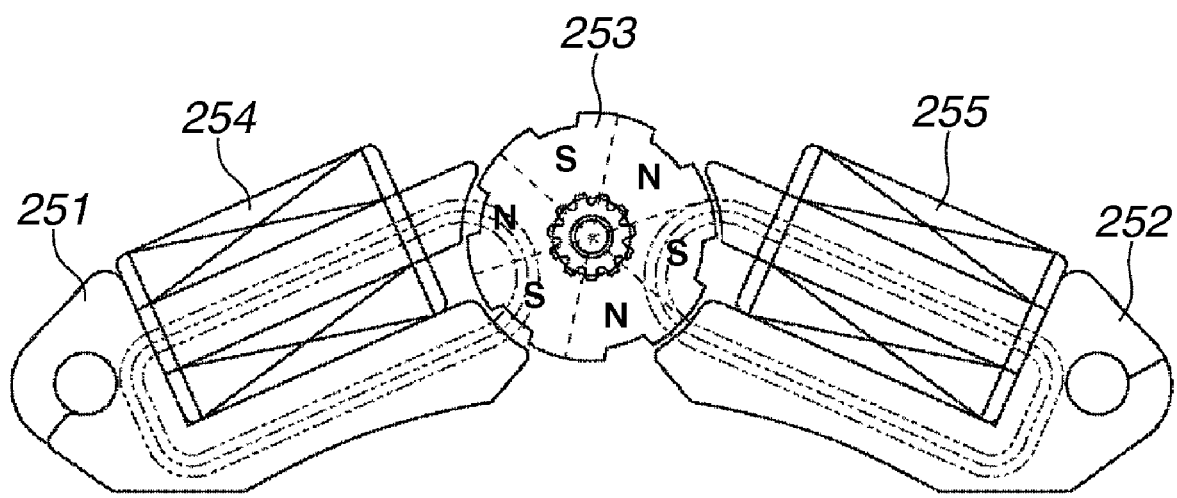
FIG. 3 is a diagram illustrating a configuration of a stepping motor according to the first exemplary embodiment of the present invention.

An operation of the stepping motor will be described referring to FIGS. 3 and 4. The stepping motor of the exemplary embodiment illustrated in FIG. 3 is a 1-2 phase excitation type which includes yokes 251 and 252, a rotor 253, and coils 254 and 255.

By switching between 1-phase excitation (one of the coils 254 and 255 is energized) and 2-phase excitation (both of the coils 254 and 255 are energized), a rotational angle (step angle) of the rotor 253 can be finely controlled. Accordingly, an aperture reducing position of the diaphragm can be controlled with a fine phase. According to the exemplary embodiment, magnetic poles of the rotor are equally divided into six: three S poles and three N poles.

While the coil is energized, the stepping motor of the 1-2 phase excitation is stabilized in a state of 1-phase excitation (401*a* and 402*a*), and a state of 2-phase excitation (403*a*). In the state of 1-phase excitation, even if the energization of the coil is cut off, the stable state continues (401*b* and 402*b*) causing no change in the aperture reducing position.

However, if energization of all the coils is cut off in the state of 2-phase excitation, the rotor rotates to a stable position (403*b* and 403*c*) causing a change in the diaphragm state. Thus, to phase-drive the diaphragm with finer accuracy as in the case of still image shooting, the energization has to be continued even after the diaphragm is driven to a desired position.

In step S009, the system controller 120 causes the leading and trailing shutter blades to travel, through the shutter control circuit 111 by the Tv value set in step S008 to read an image signal from the image sensor 112.

The read image signal is subjected to image correction processing by the DSP 115. After image conversion is carried out by the image compression circuit 119 in the JPEG compression format, an image is recorded in the recording medium 401.

In step S010, the system controller 120 checks a state of the release switch (SW1) 136, and returns to step S006 if the ON state is maintained. If the release switch (SW1) 136 is in an OFF state, the system controller 120 discards the exposure control value it holds, and drives the diaphragm to a full aperture position. Then, the process returns to step S002 after cutting-off of the energization.

An operation in the live view display mode will be described (steps S011 to S021). In step S011, the mirror is raised, and a mechanical shutter is opened. A light beam passed through the lens unit 200 is incident on the image sensor 112 to start exposure.

In a live view operation of step S012, the system controller 120 converts image signals sequentially read from the image sensor 112 into digital signals by the A/D converter 113, and subjects the images to image processing at the DSP 115.

The images are subjected to D/A conversion at the D/A converter 116, and encoded by the encoder circuit 117. Then, the images are transferred to a VRAM (not illustrated), and sequentially displayed in the image display device 118 mounted on the backside of the camera or the like.

The system controller 120 calculates a light metering value based on signals sequentially read from the image sensor 112. During the live view function operation, a light metering operation is periodically repeated. The system controller 120 obtains an exposure control value (Bv value) based on the calculated light metering value, and calculates an Av value, a Tv value, and an Sv value so that an output signal from the image sensor 112 can be equal to a predetermined luminance level.

In this case, the Av value is preferentially set so that diaphragm driving can be operated in a manner matching a phase of 1-phase excitation of the stepping motor, and the diaphragm is driven to a position corresponding to the Av value.

The Av value, the Tv value, and the Sv value used for this shooting are calculated to satisfy a Bv value, based on a program diagram different from that used for automatic exposure control of live view displaying.

Diaphragm control during a live view operation will be described referring to FIG. 4. Normally, during the live view operation, the diaphragm is preferentially controlled to a full aperture to prevent a reduction in accuracy of focus detection. Therefore, exposure control is carried out by adjusting storage time or a gain value.

However, when luminance of a captured scene is high, white saturation may occur, and maintenance of proper exposure conditions only based on the storage time and the gain can become difficult. Thus, the diaphragm is driven to reduce a light receiving amount of the image sensor 112.

In this case, to maintain accuracy of the exposure control, an exposure control value (diaphragm position based on a diaphragm value during live view) calculated based on a result of light metering calculation has to match actual exposure conditions (diaphragm position during the shooting).

Thus, the diaphragm position has to be maintained and not to be changed. However, in the case of the stepping motor of 1-2 phase excitation illustrated in FIG. 4, the diaphragm changes its position if the energization is cut off from the state of 2-phase excitation. Accordingly, the energization has to be continued to maintain the diaphragm position.

In the case of a system where imaging is carried out for a long time as in the case of the live view function or moving image recording, energization should not be continued because it will increase power consumption.

Figure 4:
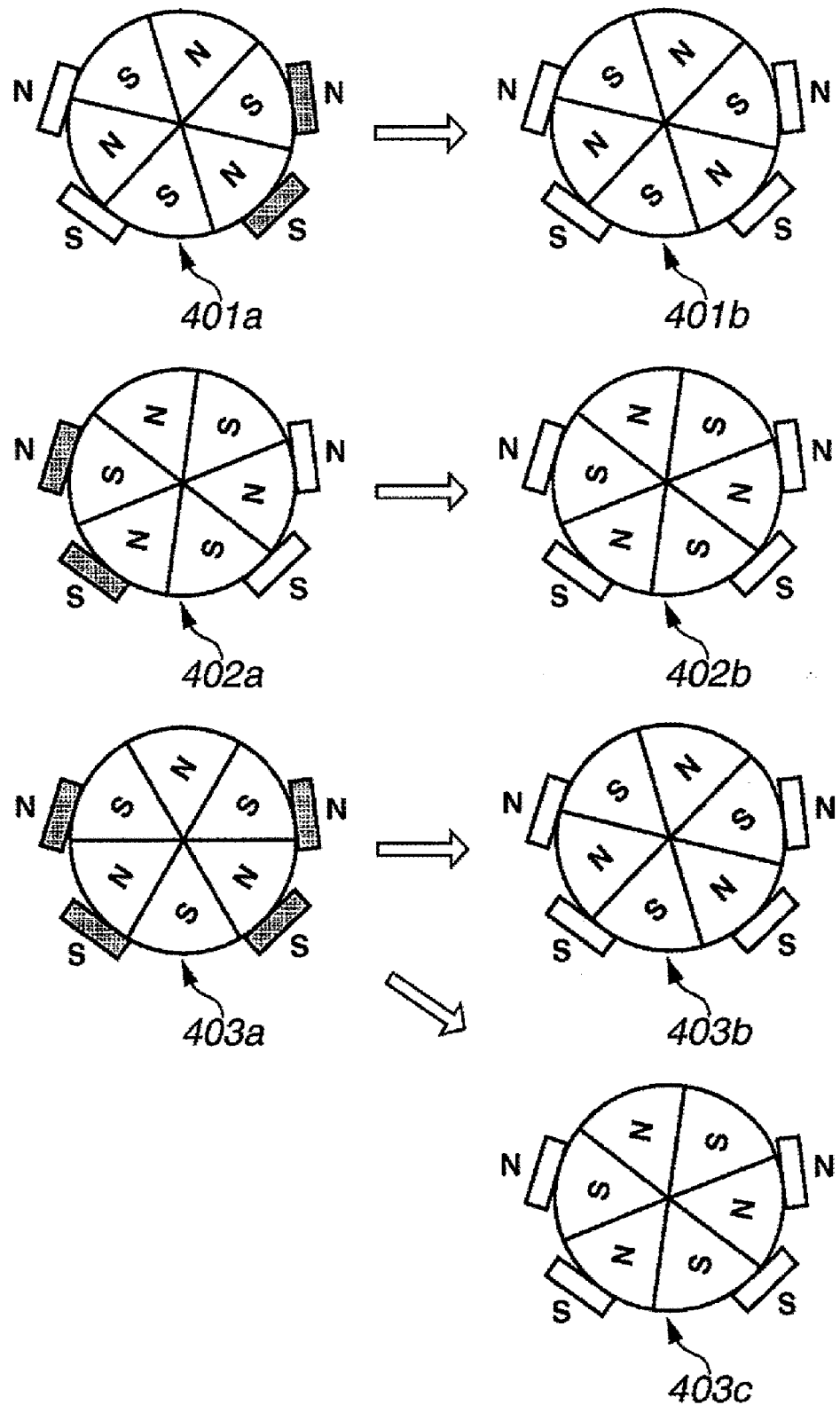
FIG. 4 is a schematic diagram illustrating an operation of the stepping motor according to the first exemplary embodiment of the present invention.

If the aperture is reduced in the state (position of 403a) of 2-phase excitation illustrated in FIG. 4, when the energization is cut off, the rotor rotates to a stable position as indicated by 403b or 403c, which causes a change in the diaphragm state.

As a result, the diaphragm position moves from an actual diaphragm position based on a diaphragm value which is set during the live view. However, since a set value is not changed, it is determined that the diaphragm position has not moved. In other words, the diaphragm is in a position (e.g., shifted to the full aperture side by 1/3 stages) different from a position set according to the diaphragm value.

If a moving amount from a currently set diaphragm position to a diaphragm position corresponding to a diaphragm value instructed by the photographer is equal to one stage, the diaphragm position moves by an amount equal to 1+1/3 stages as a result, so that a diaphragm value intended by the photographer is not realized.

In consequence, a light metering is adversely affected and exposure accuracy is reduced. Therefore, according to the present invention, the aperture is reduced by matching diaphragm driving during the live view operation, with a phase of 1-phase excitation of the stepping motor whose aperture reduced state is not changed even when coil energization is cut off.

FIG. 7 illustrates a control phase of diaphragm driving (optical finder mode or live view display mode) of the stepping motor of 1-2 phase excitation in the shooting mode. According to the exemplary embodiment, as illustrated in FIG. 7, in the stepping motor driven by a 1/8 phase unit, driving of the stepping motor is controlled not to hold a diaphragm position in 2-phase excitation in the live view display mode. In other words, control resolution of the diaphragm becomes rough in the live view display mode.

According to the exemplary embodiment of the present invention, as an example, the diaphragm is controlled in a state other than the full aperture during the live view operation. However, application of the invention is not limited to this exemplary embodiment.

The invention can also be applied to a case where the aperture has to be reduced to limit a light receiving amount such as when an aperture reduction button for checking a depth of field is pressed or when a flicker phenomenon caused by a change in illuminance of a captured scene is detected.

Figure 8:
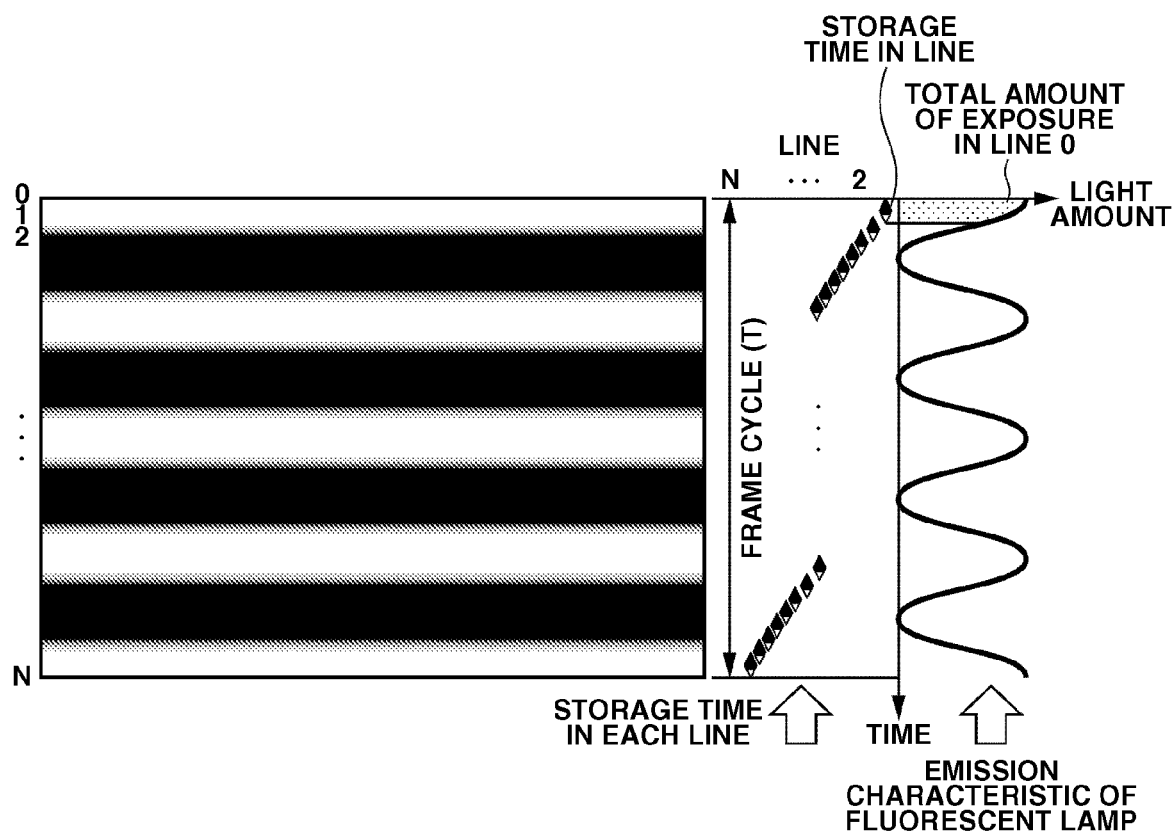
FIG. 8 is a view illustrating a relation between an emission cycle of a fluorescent lamp and a signal of an image sensor in each line.

Now, a method for detecting flicker will be described in detail with reference to FIG. 8. FIG. 8 is a view illustrating a relation between a emission cycle of a fluorescent lamp and a signal of an image sensor in each line. As illustrated in FIG. 8, if a light amount of a fluorescent lamp varies in a cycle and storage timing of a pixel of the image sensor is different in each line, a stripe pattern (i.e., line flicker) appears in a signal read out from the image sensor as illustrated in FIG. 8.

The stripe pattern appears according to a large and small amount of light of the fluorescent lamp. An interval of the stripe corresponds to a flicker cycle. Therefore, the flicker cycle can be obtained by calculating the interval of the stripe. More specifically, the cycle can be calculated by detecting a horizontal projection image. However, an actual object has various degrees of reflection within an image plane.

Accordingly, the horizontal projection of an image signal in FIG. 8 is influenced by a reflection degree of the object. Therefore, in a case where an object is the same and there is a phase difference of 180° with respect to the line flicker stripe between two images A and B as supposedly shown in FIG. 9, horizontal projection images Ah and Bh of an image signal are calculated respectively. Then, division of two images is carried out to obtain Ah/Bh. Thus, the influence of the reflection degree of the object is excluded and a signal of only flicker components can be obtained. In this case, since frequency of commercial power is 50 Hz or 60 Hz, if an image is read out, for example, at a frame rate of 22.2 fps, a phase difference of 180° occurs with respect to the line flicker stripe between two consecutive images at either frequency.

A waveform of the horizontal projection is illustrated in FIG. 10 (A) when Ah/Bh is calculated. A horizontal axis denotes a number of vertical lines. If the number of vertical lines is multiplied by scanning time of one horizontal line, time is obtained. If amplitude of the waveform illustrated in FIG. 10 (A) exceeds a predetermined value, a flicker phenomenon is confirmed. In order to prevent mistaken detection owing to unevenness of illuminance or the like within an image plane, a following process is performed. Two windows are provided in the waveform as illustrated in FIG. 10 (A), and self correlation of the waveforms within both windows is computed.

As a result, a waveform of the correlation result is obtained as illustrated in FIG. 10 (B). In this case, it is assumed that a waveform of the window 2 is shifted relative to a waveform of the window 1. When a peak of the waveform of the window 1 overlaps with a peak of the window 2, the correlation is 100. On the other hand, when a peak of the waveform of the window 1 overlaps with a bottom of the window 2, the correlation is 0. A waveform cycle of the correlation result in FIG. 10 (B) is a flicker cycle and, when there is no flicker, amplitude of the waveform in FIG. 10 (B) becomes small.

Accordingly, a correlation value threshold is predefined, and it is determined that there is flicker if the peak of the waveform in FIG. 10 (B) is equal to or more than the correlation value threshold, or the bottom is equal to or less than the correlation value threshold. If not, it is determined that there is no flicker. According to the method as above described, it is possible to detect existence or non-existence of flicker and to detect a flicker cycle if the flicker exists. However, as can be seen, several frames need to be processed before the detection is performed.

In step S013, the system controller 120 checks a state of the finder mode selection SW 138. The system controller 120 proceeds to step S014 if the optical finder mode is selected, and to step S015 if the live view display mode is selected. In step S014, the system controller 120 stops signal reading from the image sensor 112 to close the focal plane shutter 108, and lowers the main mirror 102. Then, the process returns to step S002.

In step S015, the system controller 120 checks a state of the release switch (SW1) 136, and the process returns to step S012 if the state is OFF. If the state is ON, the system controller 120 holds an exposure control value at that time, and the process proceeds to step S016. In step S016, the system controller 120 detects a focus state by using the second focus detection unit for detecting a focus based on an output signal of the image sensor 112. According to its output result, the system controller 120 communicates with the lens control circuit 204, and drives the photographic lens 201 to a desired position by the lens driving mechanism 203 to adjust a focus state.

In step S017, the system controller 120 checks a state of the release switch (SW2)137, and proceeds to step S018 if the state is OFF. If the state is ON, the system controller 120 proceeds to step S020 to start a shooting operation. In step S018, the system controller 120 checks the state of the release switch (SW1) 136, and returns to step S017 if the ON state is maintained. If the state is OFF, the system controller 120 discards the exposure control value it holds, and the process returns to step S012.

In step S019, the system controller 120 determines a Tv value, an Av value, and an ISO value used at the shooting according to the exposure control value (Bv value) calculated in step S015 and a state of the shooting mode. The system controller 120 communicates with the diaphragm control circuit 206 to reduce the aperture of the diaphragm 202 to a position according to the Av value, and continues the energized state of the coil to maintain the aperture reduced state.

In step S020, the system controller 120 causes the leading and trailing shutter blades to travel based on the Tv value set in step S017 via the shutter control circuit 111 so as to read an image signal from the image sensor 112. The read image signal is subjected to image processing at the DSP 115, subjected to image conversion in the image compression circuit 119 in the JPEG compression format, and recorded in the recording medium 401.

In step S021, the system controller 120 checks the state of the release switch (SW1) 136, and returns to step S017 if the ON state is maintained. If the state is OFF, the system controller 120 discards the exposure control value it holds, drives the diaphragm 202 to a full aperture position, and cuts off the energization. Then, the process returns to step S012.

The exemplary embodiment has been described, as an example, by way of the digital single lens reflex camera equipped with the live view function. However, the system according to the present invention does not have to be the camera system equipped with the live view function. Furthermore, the present invention can be applied to all types of camera systems that drive diaphragms by stepping motor operations and maintaining aperture reduced states.

In the camera system according to the exemplary embodiment which drives the diaphragm by the stepping motor of 1-2 phase excitation, no current is applied to maintain the aperture reduced state. Thus, an increase of power consumption can be prevented. Moreover, as the aperture of the diaphragm is reduced according to the phase of 1-phase excitation, the aperture reducing position is not changed even when the energization is stopped.

Second Exemplary Embodiment

Figure 5:
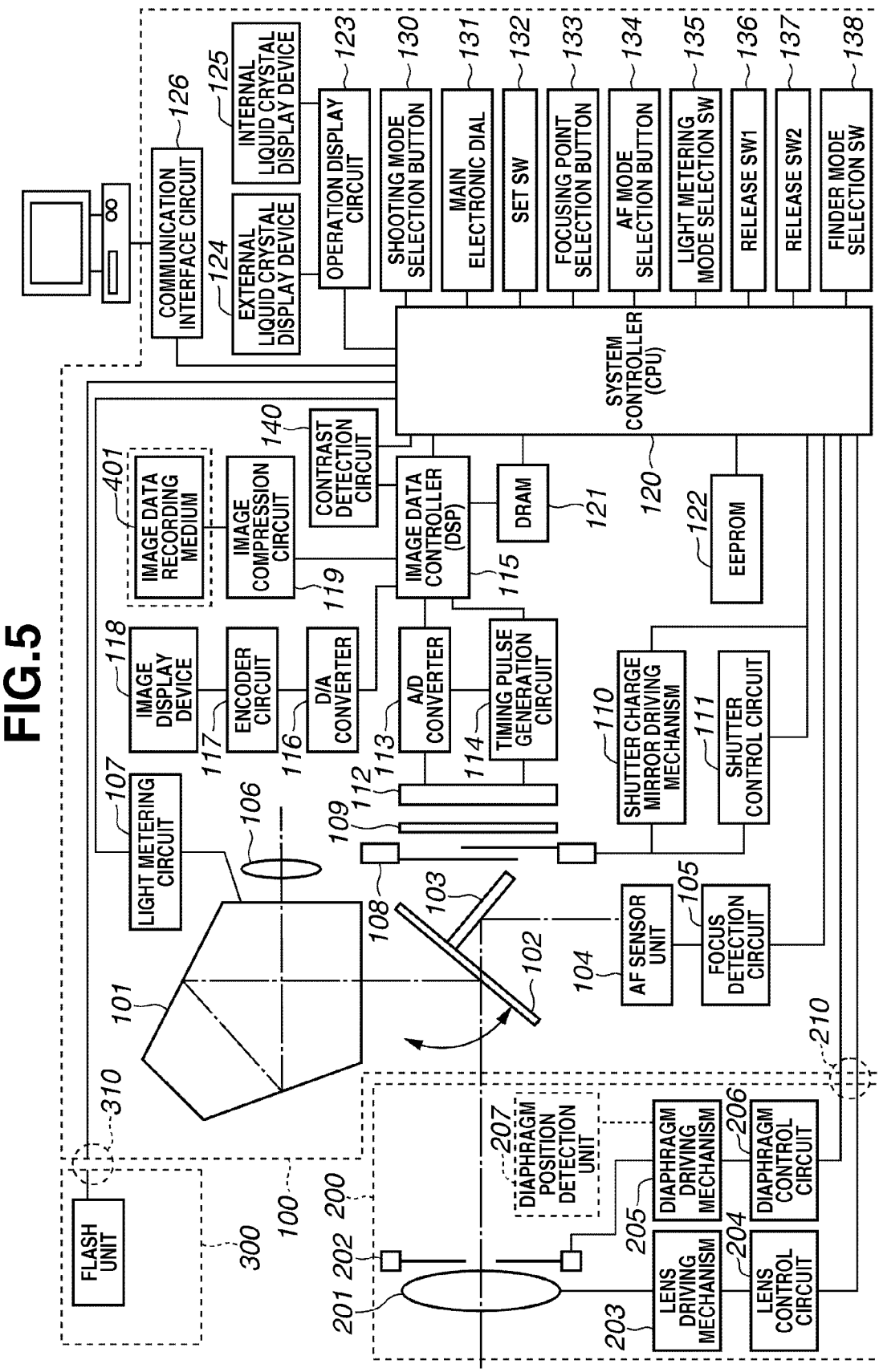
FIG. 5 is a block diagram illustrating a configuration of an imaging apparatus according to a second exemplary embodiment of the present invention.

Next, a second exemplary embodiment of the present invention will be described in detail. A single lens reflex type digital camera of the second exemplary embodiment illustrated in FIG. 5 is similar in configuration to that of the first exemplary embodiment. Therefore, description of components denoted by similar reference numerals in the block diagram will be omitted.

A diaphragm position detection unit 207 disposed in a lens unit 200 includes a sensor capable of detecting a diaphragm position and has a function of notifying, through a first electrical contact point group 210, the detected diaphragm position to a system controller 120.

Figure 6:
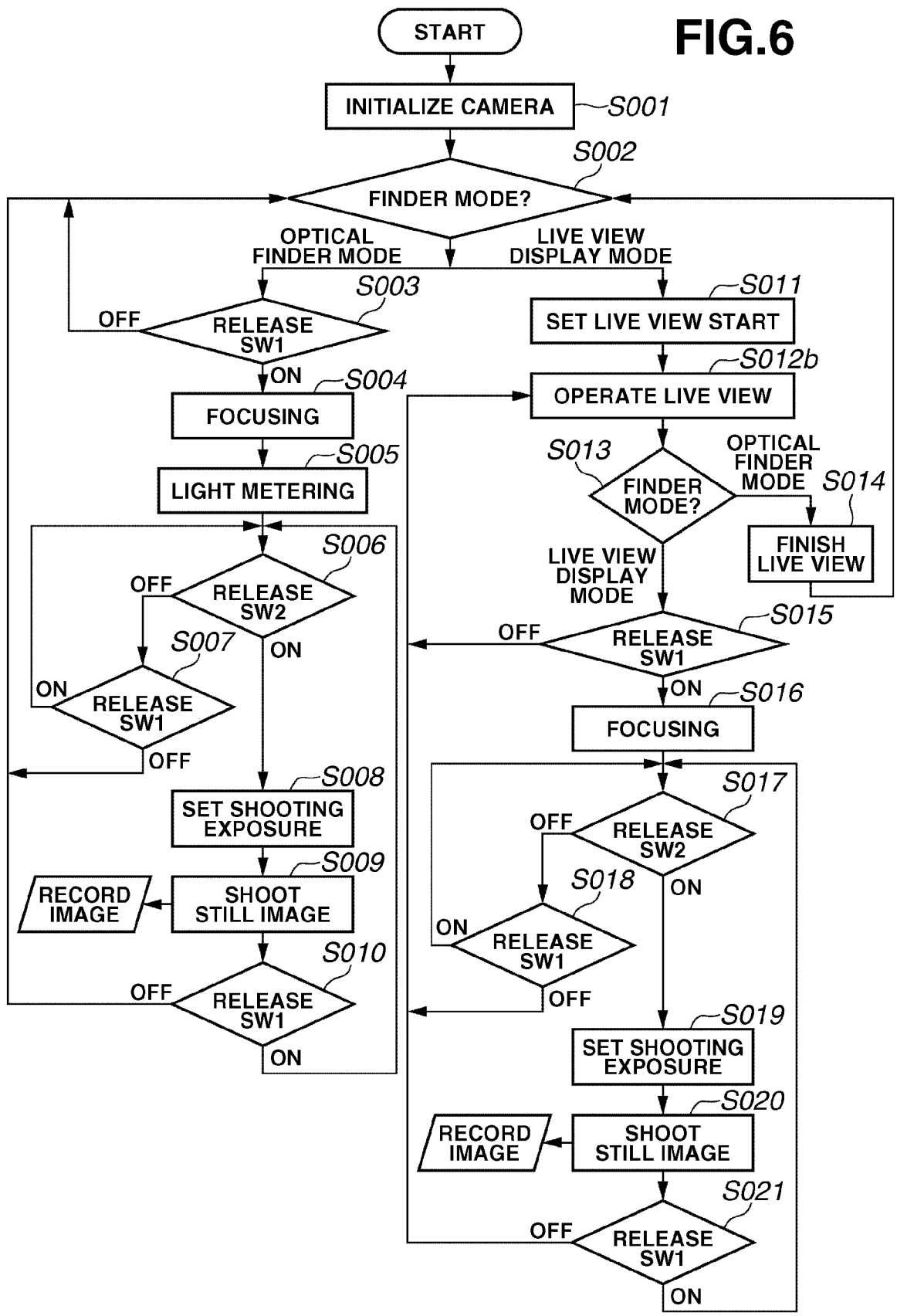
FIG. 6 is a flowchart illustrating an operation flow according to the second exemplary embodiment of the present invention.

Referring to FIG. 6, an operation flow of the system configured in the above described manner according to the second exemplary embodiment will be described in detail. As the operation flow of the second exemplary embodiment is similar to that of the first exemplary embodiment, processes similar to those of the flow of the first exemplary embodiment will be omitted.

In a live view operation of step S012b, the system controller 120 converts image signals continuously read from an image sensor 112 into digital signals with an A/D converter 113, and then carries out image processing by a DSP 115.

The image signals are subjected to D/A conversion at a D/A converter 116, encoded by an encoder circuit 117, and transferred to a VRAM (not illustrated). Then, the image signals are sequentially displayed in an image display device 118 mounted on a backside of a camera or the like.

The system controller 120 calculates a light metering value based on signals sequentially read from the image sensor 112. During a live view function operation, a light metering operation is periodically repeated. Based on the calculated light metering value, the system controller 120 obtains an exposure control value (Bv value), and calculates an Av value, a Tv value, and an Sv value so that an output signal from the image sensor 112 can be equal to a predetermined luminance level.

Driving of a diaphragm by a stepping motor of 1-2 phase excitation is controlled in both of 1-phase excitation and 2-phase excitation. An aperture is reduced up to a reducing position according to the set Av value, and then energization of a coil is cut off. Each time a change of a diaphragm position is detected by the diaphragm position detection unit 207, information about a diaphragm position at the time is notified to the system controller 120.

Then, the system controller 120 properly corrects a light metering result according to a changing amount of the diaphragm position notified from the diaphragm position detection unit 207. More specifically, when it is determined that a position of the diaphragm 202 according to the Av value calculated from the exposure control value is different from the diaphragm position supplied from the position detection unit 207, the light metering result is corrected based on a difference between the positions.

According to the exemplary embodiment, when it is determined that the diaphragm position changes, and the position is different, the light metering value is corrected. Therefore, since no error occurs in the light metering value even if energization of all the coils is cut off in a state of 2-phase excitation, exposure accuracy can be maintained.

Other Exemplary Embodiments

According to the first exemplary embodiment, the system controller 120 communicates with the diaphragm control circuit 206 to carry out diaphragm control. However, the system controller 120 can communicate with a lens microcomputer (not illustrated) in the lens unit 200, and receive an instruction from the lens microcomputer to carry out diaphragm control.

More specifically, the system controller 120 transmits exposure control information calculated in the camera body 100 to the lens microcomputer (not illustrated). When the exposure control information is received, the lens microcomputer can execute control to reduce the aperture according to a phase of 1-phase excitation of the stepping motor based on the received exposure control information.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-024432 filed Feb. 2, 2007, which is hereby incorporated by reference herein in its entirety.

What is claimed is:

1. A camera system for driving a diaphragm using a stepping motor including first and second coils and capable of 2-phase driving, comprising:

an image sensor;

a diaphragm position detection unit configured to detect the diaphragm position;

a display unit configured to display a series of images sequentially read from the image sensor;

a live view control unit configured to display image signals sequentially read from an image sensor by the display unit;

a control unit configured to energize at least one of the first and second coils to drive the diaphragm when the display unit displays the images, and to cut off the energization of the coil after the diaphragm is driven to a first position according to a first diaphragm value; and a correction unit configured to correct a light metering value obtained when the diaphragm position detection unit detects that the diaphragm position has changed to a second diaphragm position after the energization of the coil is cut off by the control unit.

2. The camera system according to claim 1, further comprising a flicker detection unit configured to detect a flicker phenomenon caused by a change in illuminance of a captured scene, wherein, when the flicker detection unit detects flicker, and when the first and second diaphragm positions are different from each other, the correction unit corrects the light metering value obtained based on the second diaphragm value, to be the light metering value obtained based on the first position.

3. The camera system according to claim 2, wherein when the display unit displays the images or the flicker detection unit detects flicker, the control unit reduces a control resolution of the diaphragm.

4. The camera system according to claim 1, further comprising a live view control unit to control the display unit to display the series of images in sequence.

5. A camera system for driving a diaphragm using a stepping motor including first and second coils and capable of 2-phase driving, comprising:

an image sensor;

a diaphragm position detection unit configured to detect the diaphragm position;

a display unit configured to display a series of images sequentially read from the image sensor;

a control unit configured to energize at least one of the first and second coils to drive the diaphragm when the display unit displays the images, and to cut off the energization of the coil after the diaphragm is driven to a first position according to a first diaphragm value; and a correction unit configured to correct a light metering value obtained when the diaphragm position detection unit detects that the diaphragm position has changed to a second diaphragm position after the energization of the coil is cut off by the control unit.

* * * * *